Oct. 25, 1949.                    B. N. ASHTON                    2,486,242
        ACTUATING MECHANISM FOR RETRACTABLE LANDING GEAR,
                 DOORS, FLAPS AND THE LIKE OF AIRPLANES
Filed Jan. 17, 1944                                        2 Sheets-Sheet 1
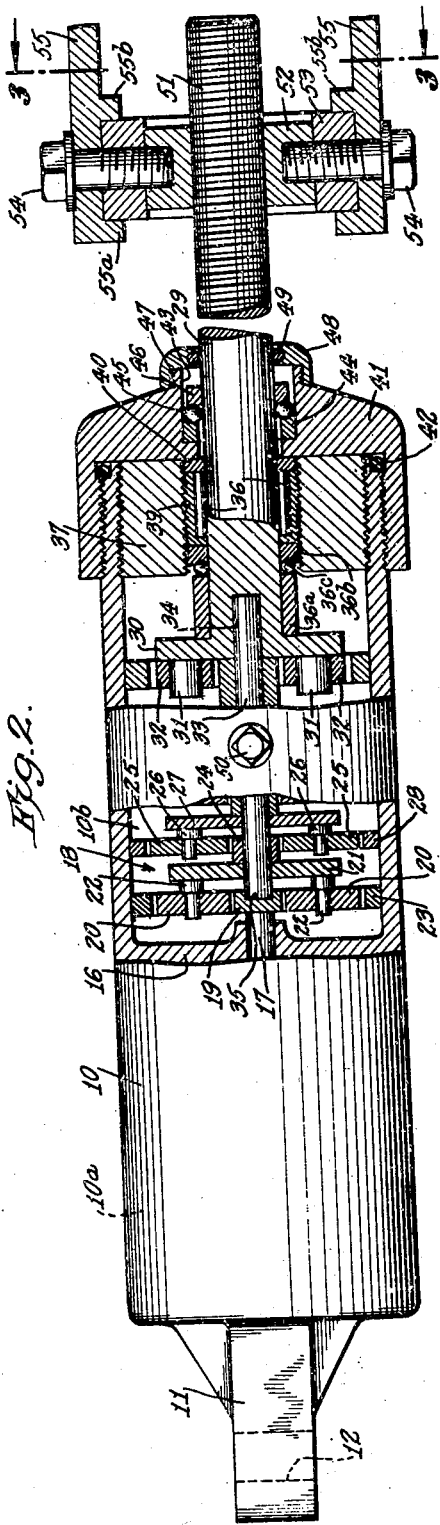
INVENTOR.
BENJAMIN N. ASHTON
BY
his ATTORNEYS

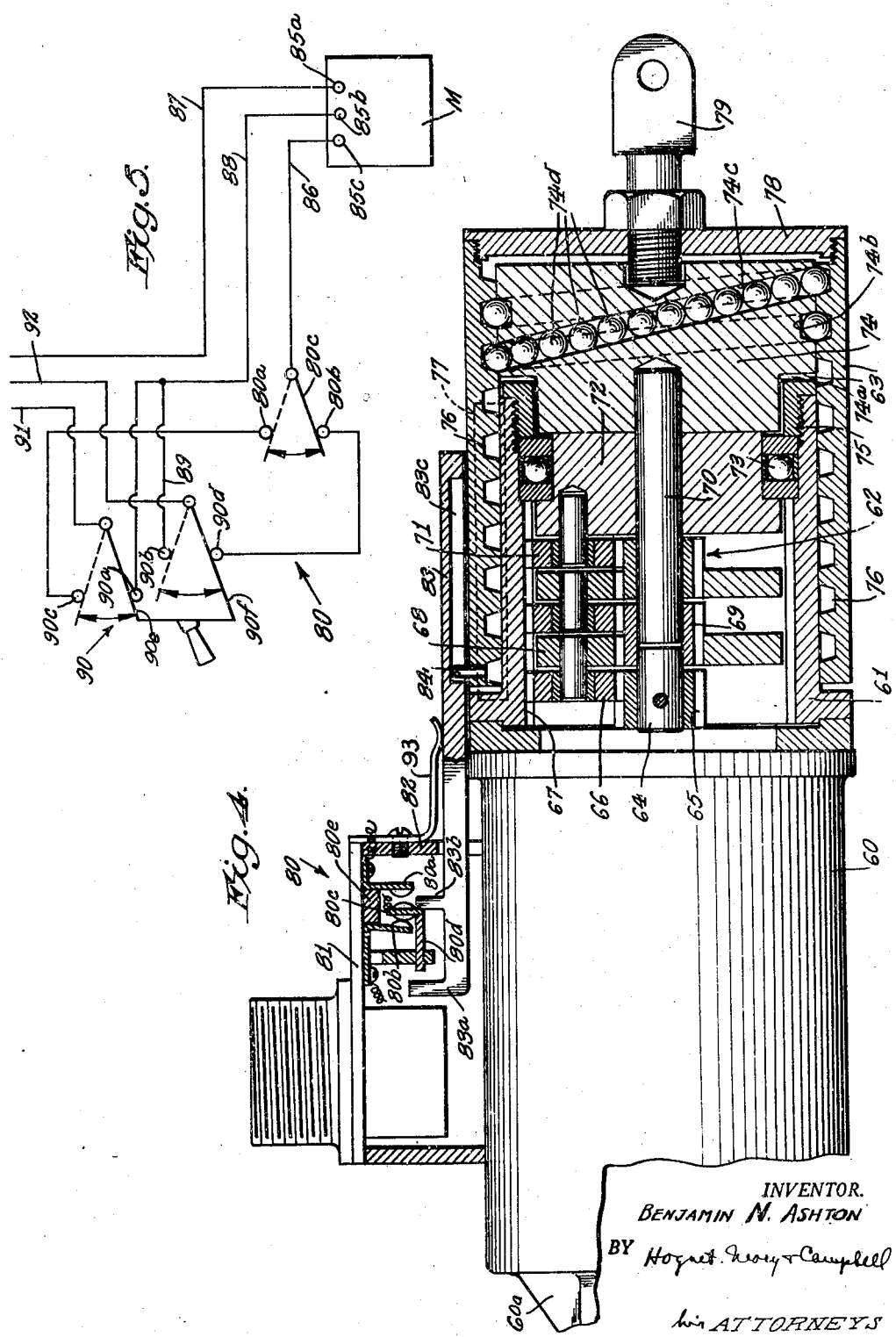

Patented Oct. 25, 1949

2,486,242

UNITED STATES PATENT OFFICE 2,486,242

ACTUATING MECHANISM FOR RETRACTABLE LANDING GEAR, DOORS, FLAPS, AND THE LIKE OF AIRPLANES

Benjamin N. Ashton, Kingston, N. Y., assignor to Electrol Incorporated, Kingston, N. Y., a corporation of Delaware Application January 17, 1944, Serial No. 518,524

5 Claims. (Cl. 244—102)

This invention relates to mechanisms for actuating retractable landing gear, doors, wing flaps and other movable elements of airplanes and the like.

The invention relates more particularly to electrically controlled and actuated mechanisms for controlling the movements of the movable elements of airplanes referred to above.

It has been suggested heretofore that such movable elements as a retractable landing gear, wing flaps, bomb bay doors and the doors covering retractable landing gear might be actuated by means of electric motors. Such devices usually include an electric motor supported at a suitable point on the framework of the airplane which drives a reduction gearing mechanism, also supported on the framework, and by means of mechanism including suitable links or levers actuates the movable or pivotally supported elements of the airplane. Such mechanisms have not gone into widespread use for the reason that they are a permanent part of the airplane and provision must be made in the airplane structure for receiving the motor and associated mechanism.

Each of the motor systems includes suitable shafting and bearings which must be supported in relatively fixed positions in order to reduce friction and operating losses to a minimum.

In aircraft having a large number of elements to be operated by electric motors and associated gearing, it is very difficult to design a suitable structure and to find adequate space for these elements. Moreover, when the airplane is damaged, there may be a tendency for the structural elements to be twisted or distorted, thereby causing loss of alignment of the shafting and bearings.

For the above reasons, it is more common to use hydraulic systems to actuate the various movable elements of the airplane inasmuch as installation problems are considerably simplified in such hydraulic systems. The actuating motors of such hydraulic systems usually include a cylinder having a piston therein and a connecting rod through which power is transmitted directly to the elements to be actuated. The cylinder is supported on a single pivot and the piston rod is pivotally connected to the elements to be actuated thereby supporting the entire hydraulic motor at only two points. As a result, the motors may be installed with much greater ease than the electric system described above and replacement and repair is greatly facilitated. Moreover, the space required for such hydraulic motors is greatly reduced and they can be applied to the aircrat at substantially any point desired without extensive modification of the design of the aircraft to receive them.

Hydraulic systems, however, have the disadvantage that they include reservoirs for the liquid and complicated systems of conduits which are distributed throughout the aircraft, depending upon the location of the hydraulic motors. Oftentimes, the conduits, pump or reservoir is damaged by gunfire and as a result the pressure throughout the system decreases to below the operating minimum and the entire hydraulic system is rendered ineffective.

Electric systems are not as easily disabled as hydraulic systems and, therefore, a system having the accessibility and ease of installation of hydraulic systems with the flexibility and all the ruggedness of the electric systems would be desirable.

The present invention has as an object the provision of an electrically actuated system which can replace or be substituted readily for hydraulic systems of the type used heretofore.

Another object of the invention is to provide an electrically actuated mechanism for actuating the movable elements of airplanes having the ease of installation and flexibility of the hydraulic motors heretofore used.

Another object of the invention is to provide an electrically energized actuating mechanism for the wing flap landing gears and other movable elements of airplanes which can be suspended bodily between the frame of the aircraft and the element to be operated, whereby the actuating mechanism can be readily installed or replaced.

Other objects of the invention will become apparent from the following description of a typical form of device embodying the present invention.

In accordance with the present invention, an actuating mechanism for retractable landing gear, wing flaps, doors and the like of airplanes may include a casing member which may be connected pivotally to a structural element of an airplane and suspended therefrom. The casing contains a reversible electric motor and suitable reduction gearing for driving a member that is movable lengthwise of the casing.

More particularly, the member may include a nut member that is threaded on and movable axially of a shaft driven at reduced speed by the reduction gearing. The nut member may be connected by suitable means, rigid therewith, to a lever or part of the movable element of the airplane so that upon movement of the nut along the shaft, the movable element may be projected or retracted as required.

The mechanism described above forms a relatively rigid and extensible driving mechanism which is supported only at its opposite ends, thereby permitting its installation in an aircraft at substantially any desired location.

All of the bearings, gearing or shafting in the mechanism are supported by the casing so that twisting or bending of the airplane framework will not cause misalignment of the bearings and the shafting.

Inasmuch as each of the actuating mechanisms described generally above is independent of the others, damage to one portion of the wiring system will not render other portions of the system inoperative and, as a consequence, at least a portion of the operating mechanism may retain its operativeness even though the system is damaged in a number of places.

For a better understanding of the present invention, reference may be had to the accompanying drawings in which:

Figure 1 is a view in side elevation illustrating the application of the mechanism embodying the present invention of a typical form of retractable landing gear;

Figure 2 is a plan view of the actuating mechanism of Figure 1, partly broken away to show details of construction;

Figure 3 is a view in sequence taken of line 3—3 of Figure 2;

Figure 4 is a view in side elevation and partly in section of a modified form of actuating device; and Figure 5 is a diagrammatic view of the control circuit for the device of Figure 4.

The form of actuating mechanism chosen for purposes of illustration of the present invention includes hollow cylindrical casing 10 having a lug 11 at one closed end thereof which is provided with transverse opening 12 for receiving a pivot pin 13. The lug 11 permits the casing 10 to be connected to the bracket 14 that is secured to a structural element 15 of an airplane.

The casing 10 is provided with a transverse partition 16 dividing the casing into two compartments 10a and 10b. The compartment 10a contains a small, high speed, reversing electric motor of known type having a shaft 17 projecting through and journaled in the partition 16.

The motor is used to drive a reduction gearing 18 which, as illustrated, may be of the planetary type and may consist of a suitable number of planetary gear systems to effect a desired speed reduction.

The form of gear reduction system shown may include a sun gear 19, fixed to the motor shaft 17 that meshes with a plurality of planet gears 20 each supported rotatably upon a spider 21 by means of a stub shaft 22. The planet gears 20 mesh with a ring or internal gear 23 fixed to the inside of the casing 10 whereby, upon rotation of the sun gear 19, a lower speed of rotation of the spider 21 is obtained.

The spider 21 may also be provided with a sun gear 24 which meshes with a plurality of planet gears 25 each rotatably supported upon a stub shaft 26 fixed to the spider 27.

The planet gears 25 mesh with the ring gear 28 fixed to the interior of the casing 10. As many series of planetary gear systems, like those described above, as may be required may be placed in the casing so that, for example, the motor speed of approximately 15,000 revolutions per minute may be reduced to about 100 revolutions per minute at the power output end.

The above-described gear reduction system is connected to a shaft 29 which is provided at its inner end with the spider or plate 30 having stub shafts 31 thereon on which the planet gears 32 are supported.

As shown in Figure 2, the planet gears 32 may be considerably heavier and stronger than the planet gears 20 and 25 in order that they will be capable of transmitting the increased power to the shaft 29.

The various planetary trains including the spiders 20, the gears 24, the spider 27, etc., are supported on a shaft 33 which is received or journaled in a recess 34 in the center of the shaft 29 and the recess 35 in the end of the gear 19. The shaft 33 is not driven by any of the gears and merely acts to support and maintain alignment of the planetary gear systems in the casing.

The shaft 29 is maintained against endwise movement to the right by means of a thrust bearing 36 including a collar 36a on the shaft 29 and a bearing race 36b threaded into the cylindrical plug 37 which in turn is threaded into the end of the casing 10.

The anti-friction balls 36c are interposed between the races 36a and 36b and thereby prevent the endwise movement of the shaft. The shaft 29 is, moreover, journaled in needle bearings 36 interposed between the shaft 29 and the bearing race sleeve 39 threaded into the plug 37 and retained therein by means of externally threaded retaining ring 40 at the right-hand end of the plug 37.

The end of the casing 10 is further provided with an internally threaded cap member 41 which is threaded on the exterior of the casing 10 and may be sealed thereto by means of a gasket or rubber ring 42 received therebetween to prevent leakage between the cap 41 and the casing 10. The cap is provided with an annular recess 43 containing a bearing race 44, the anti-friction bearings 45 and for receiving the bearing race 46 that is threaded on the shaft 29, thereby forming a thrust bearing preventing the movement of the shaft to the left.

The cap 41 is further provided with an externally threaded collar 47 for receiving a closure cap 48 that is provided with an oil seal 49 at its inner periphery which prevents escape of the lubricant around the shaft.

The above-described reduction gearing and the bearing for the shaft 29 may be lubricated by means of a liquid lubricant received in chamber 10b. This chamber is provided with a filling opening which is closed by means of the plug 50 so that the oil therein may be replenished as required.

The shaft 29 exterior of the casing 10 is provided with threads 51 which are received within the generally annular nut member 52. The nut member 52 is mounted in a generally square metal frame 53 which is affixed thereto by means of four or more bolts 54, thereby preventing relative movement between the frame 53 and the nut member 52.

In the construction described above, upon operation of the motor in one direction, the shaft 29 will be rotated at a very much decreased speed relatively to the motor. Inasmuch as the nut member 52 is retained against rotation, it will move axially of the shaft in one direction. Upon reversal of the motor, the nut member 52 will travel in the opposite direction along the shaft, thereby making it possible to produce an apparent expansion and contraction in the length of the operating mechanism. This expansion and contraction may be utilized to actuate a retractable landing gear, or other element, as illustrated in Figure 1. Thus, if the frame 53 is connected by one or more links 55 to the end of the landing gear strut 56 above a point of pivotal support 57, the strut will be rocked in a counterclockwise direction upon movement of the nut 52 and the frame 53 to the left and will be rocked in a clockwise direction upon movement of the nut 52 and frame 53 to the right. In this way, the landing gear wheel 58 may be projected from or retracted into the wing or fuselage of the airplane.

In order to prevent buckling of the assembly, the links 55 are secured rigidly to the frame member 53 as shown in Figures 2 and 3. Thus, the links 55 are provided with the inwardly projecting lugs 55a and 55b disposed on opposite sides of the frame 53 and the links are secured to the frame by means of the bolts 54 extending through the sides of the frame 53 and into the nut member 52.

From the preceding description, it will be apparent that the actuating mechanism embodying the present invention may be suspended between the mechanism to be actuated and the frame or other structural elements of the airplane with only two points of connection, thereby greatly facilitating the installation of such elements and the replacement or repair thereof.

It will be understood that the overall length of the casing 10 and the shaft 29 and connecting links 55 will be approximately equal to the overall length of the hydraulic motor or ram used for the same purpose and, therefore, these elements can be installed interchangeably, if desired, and in substantially the same space requirements.

The modified form of actuating mechanism disclosed is suitable for use in actuating the engine cowl flaps of an airplane. This device includes the casing 60 for the reversible electric motor and a sleeve 61 secured to the end of the casing forming a housing for the planetary gear system 62 and a support for the sleeve 63 slidably mounted on its exterior. The casing 60 is supported pivotally at one end by a lug 60a, like the lug 11 described above.

The planetary gear system illustrated in Figure 4 differs somewhat from that disclosed in Figure 2. As shown, the motor driveshaft 64 has a sun gear 65 pinned to it that meshes with the planet gears 66. These gears mesh with the internal gear 67 and are carried by a ring 68 having internal teeth that are splined to the end of the next adjacent sun gear 69. The sun gear 69 and successive sun gears are supported on a shaft 70, coaxial with the shaft 64.

The last planet gears 71 of the train are supported by a disc-like member 72 that is rotatably supported in the sleeve 61 by means of a ball thrust bearing 73 and the shaft 70.

A drive member 74 is fastened to the disc member 72 by bolts or by any other desired means and has a recess 74a in its inner edge overlying the exteriorly threaded ring 75 that is threaded into the end of the sleeve 61, engages the bearing 73 and retains the gearing 62 in the sleeve 61.

The drive member 74 is also provided with an external helical groove 74b, extending about one and one-half times around the member, the remote ends of the groove being connected by a straight bore or hole 74c extending through the member 74. The groove 74b and bore 74c are adapted to be filled with anti-friction balls 75, thereby forming with similar helical grooves 76 or female threads in the sleeve 63 a substantially frictionless drive screw and nut.

As the member 74 rotates, the balls 75 roll along the grooves 74b and 76 and pass through the bore 74c moving the sleeves 61 and 63 relatively axially. Relative rotation between the sleeves 61 and 63 is prevented by means of the key 77 engaging in grooves in the opposed walls of the sleeves 61 and 63.

The sleeve 63 is provided with an end plate 78 in which is mounted a coupling or hinge member 79 that may be connected pivotally to an actuating element for the cowling flaps.

In order to limit the movement of the sleeve 63 axially, the device may be provided with a limit control switch 80, having a pair of resiliently supported switch contacts 80a and 80b and a shiftable contact member 80c interposed therebetween. The switch 80 may be mounted on the cover plate 81 of a switch casing 82 that is supported on the motor housing 60.

The switch contact member 80c is mounted on a bar or rod 84d that extends through an insulated support. The bar 80d is interposed between the two uprights 83a and 83b of the shiftable bar 83 that projects from within the casing and extends alongside the sleeve 63. The bar 83 has a groove 83c therein for receiving the pin 84 that projects outwardly from the sleeve 63. The groove 83c is slightly shorter than the extreme distance of travel of the sleeve 63 and serves to prevent overtravel of the sleeve 63.

Figure 5 of the drawings illustrates a typical circuit for controlling the operation of the device of Figure 4. As shown, the motor M is provided with three contacts, 85a, 85b and 85c, the latter being connected to the movable contact member 80c of the switch 80, by the conductor 86. The contact 85a is connected directly to a source of electrical energy by a conductor 87, while the contact 85b is connected by the conductors 88 and 89 to the contacts 90a, 90b of a double-pole, double-throw switch 90.

The contact 80a of the switch 80 is connected to the contact 90c and the contact 80b is connected to the contact 90d of the switch 90.

The blades 90e and 90f of the switch 90 are connected by the conductors 91 and 92 to the other poles of the source of electrical energy.

With the switch 80 and the switch 90 in the positions shown in Figures 4 and 5, the motor M will be energized to advance the sleeve to the right as viewed in Figure 4. As the sleeve 63 moves, the bar 83 is freed for movement to the right inasmuch as the pin 84 is disengaged from the left-hand end of the groove 83c. The bar 83 is retained against movement, however, by means of the resilient braking finger 93 carried by the housing 82 and engaging the bar. Near the end of axial movement of the sleeve 63, the pin 84 engages the end of the groove 83c and moves the bar 83 to the right. When the upright 83a engages the rod 80d of the switch, the contact member 80c engages the contact 80a, while maintaining engagement with the contact 80b for a short distance after engaging the contact 80a.

The contact 80a is displaced to the right until the member 80c is disengaged from the contact 80b, inward movement of both of the contacts 80a and 80b being limited by the insulated stop block 80e. At this time, the motor circuit through the switches 80 and 90 is broken and a different circuit established that can be closed by shifting the blades 90e and 90f into engagement with the contacts 90b and 90c to reverse the motor and return the sleeve 63 to its initial position.

From the preceding description, it will be clear that projection of the sleeve 63 to its limit of movement stops the motor and establishes a circuit for retracting the sleeve. Return movement of the sleeve, resets the switch 80 to project the sleeve 63. The above-described arrangement, therefore, prevents overtravel of the sleeve 63 and allows only a repeated cycle of projection and retraction of the sleeve 63 and associated mechanism.

In systems of the type embodying the invention, the control switch may be positioned on a control panel in the airplane, for example, on or adjacent to the instrument panel and the electrical energy can be supplied from storage batteries and/or a generator driven by the airplane engine.

Inasmuch as the actuating mechanisms described above are relatively independent of each other, when one mechanism is damaged, the operation of the other elements may not be affected. Thus, even though the wing flaps, for example, are rendered inoperative by damage to the actuating mechanism, the landing gear may remain completely operative, thereby permitting a safe landing of the airplane.

It will be apparent from the preceding description that the actuating mechanisms of the type embodying the invention have the advantages of the compactness and ease of installation that are characteristic of hydraulic motors and the independence of operation of electric systems of the type heretofore used.

It will be understood, moreover, that while the preferred embodiment of the invention is disclosed and described herein, the mechanism is susceptible to considerable modification without departing from the invention. Thus, the type of motor used therein, its size and speed, and the type of gear reduction system, and its gear ratios and the drive for the projectible and retractable element may be modified considerably. Therefore, the form of the invention described herein should be considered as illustrative, only, and not as limiting the scope of the following claims.

I claim:

1. An apparatus for actuating retractable elements of airplanes and the like, comprising a reversible electric motor having a casing, a first sleeve fixed at its inner end to one end of said casing, speed reduction mechanism in said sleeve and actuated by said motor, a rotatable member at the outer end of said sleeve driven by said speed reduction mechanism, a second sleeve supported on, slidable axially of and longer than said first sleeve, said second sleeve and said rotatable member having similar helical grooves in their opposed surfaces forming a helical passage, a plurality of balls in said passage for coupling said second sleeve and rotatable member to move said second sleeve axially upon rotation of said rotatable member, and means for returning said balls from one end of the helical groove in said rotatable member to the other end.

2. An apparatus for actuating retractable landing gear, wing flaps and other pivotally mounted elements of airplanes, comprising a hollow cylindrical casing having a lug at one end for connecting said casing pivotally to a structural element of an airplane, a sleeve extending from said casing coaxial therewith and having at least one internal ring gear fixed thereto, a reversible electric motor in said casing, a driving member having helical driving means thereon rotatably mounted in an end of said sleeve remote from said lug, planet gears rotatably mounted on said driving member eccentrically thereof and meshing said ring gear, a sun gear driven by said motor and meshing with said planet gears, driven means surrounding said driving member and movable axially in response to rotation of the latter, and means rigidly connected to said driven means and pivotally connected to a pivotally supported element of said airplane for rocking said element about its pivot.

3. An apparatus for actuating retractable elements of airplanes and the like, comprising a reversible electric motor having a casing, a sleeve extending from one end of said casing, speed reduction mechanism in said sleeve connected to and adapted to be actuated by said motor, a rotatable member at the end of said sleeve remote from said motor and connected to and driven by said reduction mechanism, said member having a peripheral helical groove and an internal passage connecting the opposite ends of said groove, a member telescopically receiving and movable axially of said sleeve and having a helical groove opposing and forming, with the groove in said rotatable member, a helical passage and a plurality of antifriction balls filling the said helical passage and said internal passage and forming an antifriction drive coupling for moving said axially movable member relatively to said casing.

4. An apparatus for actuating retractable landing gears, wing flaps, and other movable elements of airplanes comprising a casing having means for connecting the casing to a structural element of an airplane, a high speed reversible electric motor in said casing, a sleeve extending from one end of said casing, speed reduction gearing in said sleeve driven by said motor, a member surrounding and movable lengthwise of said sleeve, drive means connected to said gearing and disposed adjacent to the outer end of said sleeve for moving said member, means rigid with said member for connecting said member to a movable element of an airplane, manually actuated switch means electrically connected with said motor for reversing said motor, and a second switch electrically connected to said manually actuated switch means and said motor for limiting axial movement of said member, and means responsive to axial movement of said member for actuating said second switch.

5. An apparatus for actuating retractable landing gears, wing flaps, and other movable elements of airplanes comprising a casing having means for connecting the casing to a structural element of an airplane, a sleeve extending from one end of said casing, a high speed reversible electric motor in said casing, speed reduction gearing in said sleeve driven by said motor, a member movable lengthwise of and surrounding said sleeve, drive means connected to said gearing and disposed adjacent to the outer end of said sleeve for moving said member, means rigid with said member for connecting said member to a movable element of an airplane, an electric circuit including a first manually actuated switch electrically connected with said motor and a source of electrical energy for reversing said motor, a second switch connected between said first switch and said motor, a slide element adjacent to said member for actuating said second switch, and a lost motion connection between said slide element and said member for moving said slide element in opposite directions to limit axial movement of said member and condition said circuit for reversal of said motor by said first switch.

BENJAMIN N. ASHTON.

REFERENCES CITED

The following references are of record in the file of this patent:

UNITED STATES PATENTS

| Number | Name | Date |
|---|---|---|
| 1,281,275 | Berry | Oct. 15, 1918 |
| 1,398,279 | Rapson | Nov. 29, 1921 |
| 2,120,717 | Sikorsky | June 14, 1938 |
| 2,153,667 | Hoekstra | Apr. 11, 1939 |
| 2,166,106 | Gormley | July 18, 1939 |
| 2,320,953 | Shenstone | June 1, 1943 |
| 2,325,548 | Roos et al. | July 27, 1943 |
| 2,383,901 | Werner | Aug. 28, 1945 |
| 2,387,800 | Leland et al. | Oct. 30, 1945 |
| 2,393,924 | Millns | Jan. 29, 1946 |
| 2,398,789 | Hoffar | Apr. 23, 1946 |

FOREIGN PATENTS

| Number | Country | Date |
|---|---|---|
| 512,105 | Great Britain | Aug. 29, 1939 |